Oct. 16, 1956  D. S. WEISS  2,766,995
POSITIVE LOCK TRAILER HITCH
Filed June 9, 1953  2 Sheets-Sheet 1

INVENTOR.
DEWEY S. WEISS
BY
Buckhorn and Cheatham
ATTORNEY

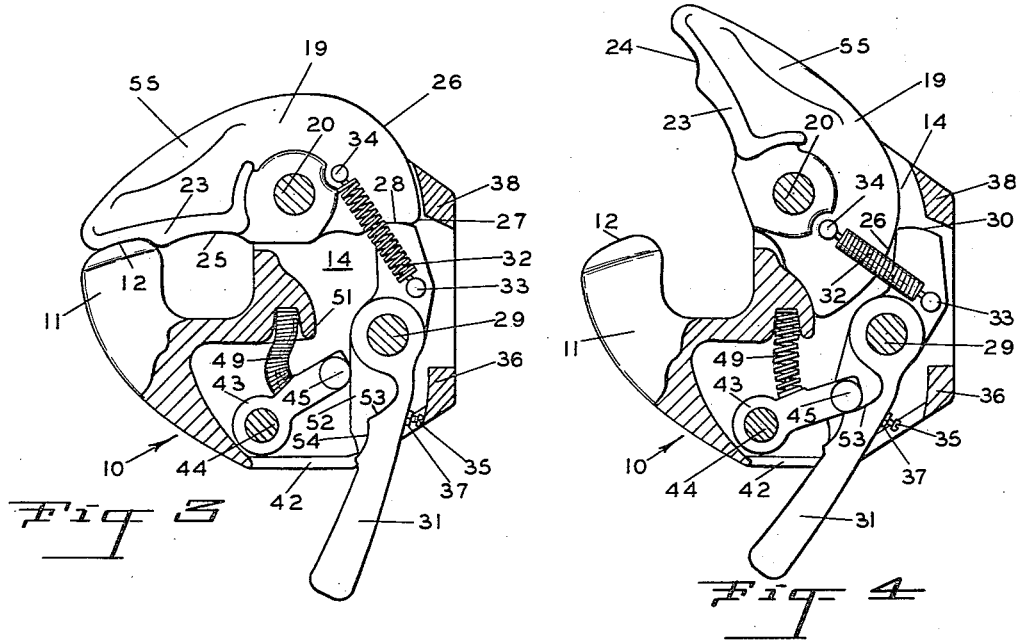
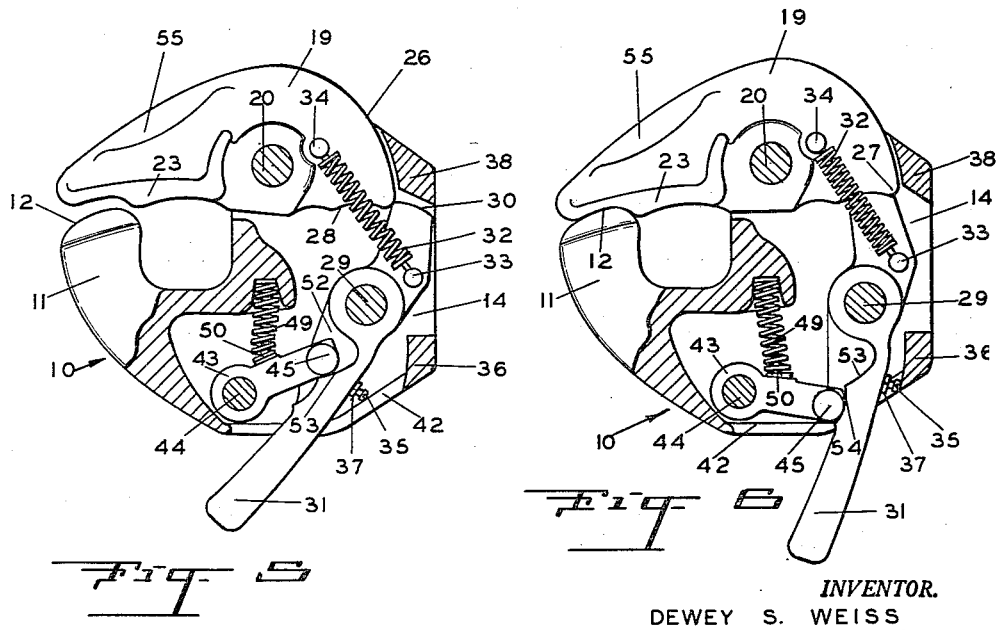

United States Patent Office 2,766,995
Patented Oct. 16, 1956

2,766,995

POSITIVE LOCK TRAILER HITCH

Dewey S. Weiss, Portland, Oreg.

Application June 9, 1953, Serial No. 360,549

5 Claims. (Cl. 280—504)

The present invention is an improvement upon the trailer coupling disclosed and claimed in my prior Patent No. 2,124,839, issued July 26, 1938, and has for one of its objects the provision of a trailer coupling correcting all of the faults and weaknesses observed in the patented coupling.

The present invention is designed primarily to couple trailers for heavy loads, such as logging trailers, vans and gasoline tank trailers, to a truck tractor or other automotive prime mover. An object of the present invention is therefore to make a coupling device which is stronger and less susceptible to failure under heavy use than those heretofore known. In furthering this object of the invention all pivot pins, levers and other parts have been made sturdier, any weak part has been eliminated, and the number of parts reduced.

A further object of the present invention is to provide a coupling of the character described which is substantially protected from becoming plugged or clogged by snow, ice, debris and mud. A feature of the present coupling is that the operating handle thereof is now at the bottom of the coupling rather than at the side and hence is less susceptible to possible breakage.

The major object of the present invention is to provide a coupling which cannot be half-locked. The coupling of the present invention is either securely locked, or held open, the latter position being so obvious that a driver will not be misled into starting off with the trailer insecurely hitched to the cab.

A further object of the present invention is to provide a coupling of the character described, dependent for automatic action in certain respects upon a pair of springs, but which cannot fail in use if either spring should become broken. Either one of the two springs in the present coupling may become ineffective or lost without impairing the safety of the unit.

A further object of the present invention is to provide a coupling in which a pair of springs are incorporated to make the coupling easily and quickly operable, either to attach or release the trailer, but which are installed in such a manner that compression or tension thereof is relieved in both the latched and unlatched positions of the coupling, thus insuring longer life of the coupling springs.

A further object of the present invention is to provide a coupling of the character described in which safe operation of the coupling is assured even though the pivot pins and other parts thereof may become considerably worn, or the springs broken.

A further object of the present invention is to provide a coupling of the character described in which all wearing parts are easily accessible and can be replaced without the use of special tools and without removing the coupling from the frame of the truck. The achievement of this object thus promotes better maintenance on the part of the operator.

The foregoing and other objects and advantages of the present invention will be more readily apparent from inspection of the accompanying drawings taken in connection with the following specification and in which like numerals refer to like parts throughout.

In the drawings,

Fig. 3 is a side view, with parts broken away to illustrate the internal mechanism, and showing the latch raised to permit movement of the operating handle;

Fig. 4 is a view corresponding to Fig. 3 showing the operating handle pulled rearwardly to unlock the coupling;

Fig. 5 is a view corresponding to Fig. 3 showing the retainer in almost closed position, from which position the parts would return to the positions illustrated in Fig. 4 if closing pressure on the retainer were released prior to moving the retainer to completely closed position; and Fig. 6 is a view similar to Fig. 1 showing the coupling in locked condition.

Figures 1, 2:
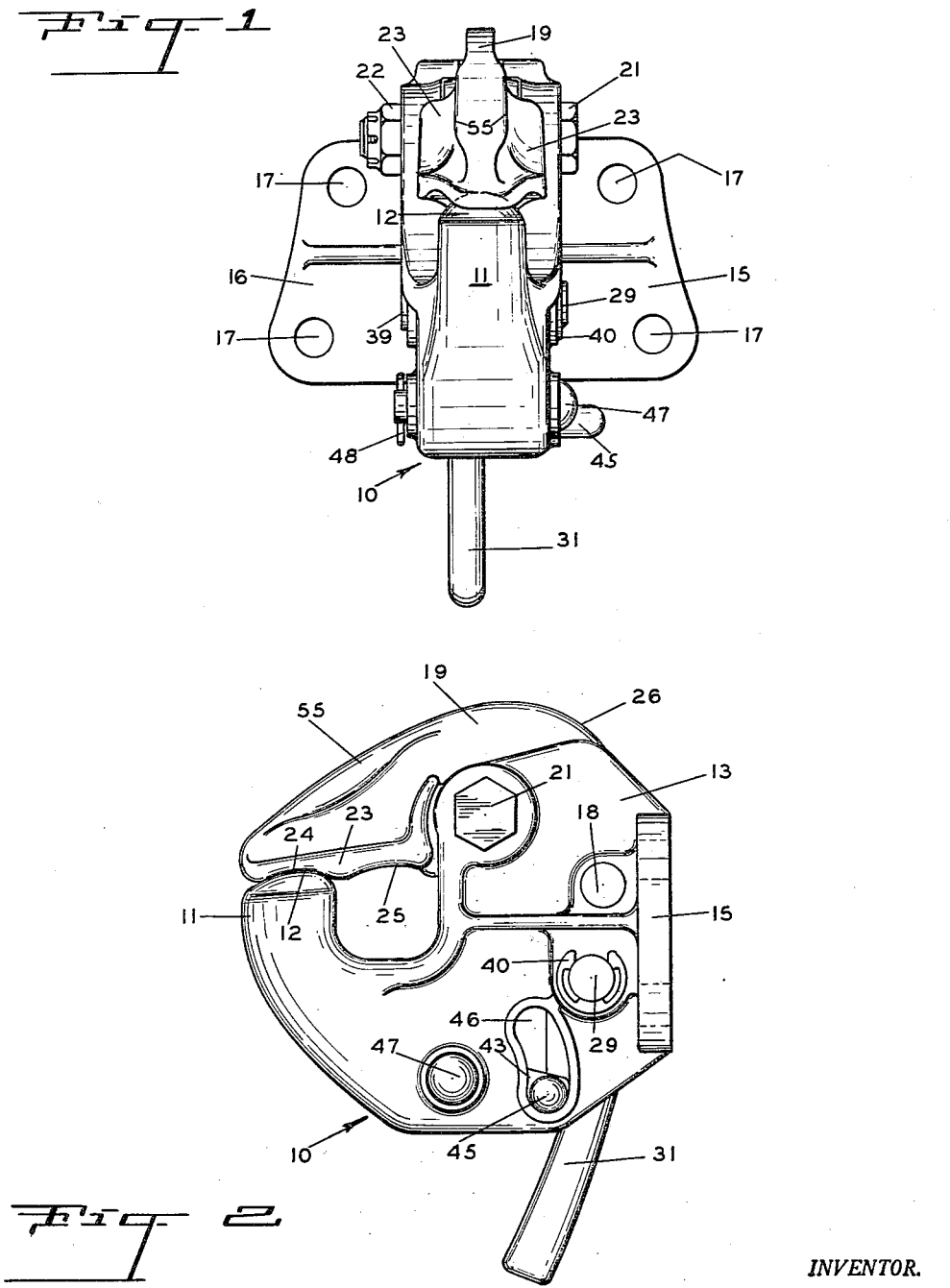
Fig. 1 is an end view of the coupling when closed and locked.
Fig. 2 is a side view of Fig. 1.

The coupling of the present invention comprises a body 10 including a rearwardly and upwardly extending integral hook 11 terminating in a rounded upper surface 12, the body having spaced side walls 13 and 14 defining an internal cavity. At the front edges of the side walls there are integral mounting flanges 15 and 16, respectively, each flange having a pair of holes 17 therein for the reception of bolts or rivets whereby the coupling may be attached to a vehicle. The side wall 13 is preferably provided with a small opening, normally closed by a suitable cap or plug 18 which may be removed to permit inspection of parts of the internal mechanism and the insertion of an oil can spout or the like.

The eye of a draft tongue on a trailer, or equivalent device, may be slipped over the hook 11 when the coupling is opened, and the eye retained by a retainer 19 when the coupling is closed. The retainer is pivotally mounted between suitable bosses on the rearward, upper corners of the side walls 13 and 14 by easily separable means comprising a bolt 20 having a head 21, the opposite end of the bolt being threaded for engagement by a castellated nut 22 which may be pinned in tightened position by a cotter pin (not shown). The retainer is essentially a plate of great strength, and the portion of the retainer which overhangs the hook and the embraced portion of the eye is preferably braced by flanges 23 extending along both sides of the lower edge thereof to provide a wide wearing surface against which the retained eye may rub without creating undue wear and to provide an extremely strong structure which is unlikely to be broken in use. The upper edges of the side walls 13 and 14 are inwardly flanged to provide a narrow slot into which the retainer snugly fits to prevent ingress of foreign matter. The rearward lower surface of the retainer is provided with a rounded recess 24 into which the rounded upper surface 12 of the hook projects. The lower surface of the overhanging portion of the retainer is preferably rounded as indicated at 25, whereby to more snugly embrace a rounded eye of a dimension to fit the bight of the hook, thus lessening wear due to chattering and hammering of the eye in the coupling. The upper forward surface 26 of the retainer is convex to provide an operating lever cam, and is slightly eccentric with respect to the bolt 20, the radius of the surface 26 increasing slightly toward a lower toe 27 at the end of the retainer. The lower surface of the retainer is slightly concave inwardly from the toe 27 as indicated at 28, the surface 28 lying substantially along an arc about a pivot pin 29, spanning the space between the side walls, when the retainer is in locked position as illustrated in Fig. 3. The surface 28 is slightly eccentric with respect to the pivot 29, its greatest radius being adjacent the toe 27 in order that the upper, rounded end surface 30 of an operating lever 31 pivoted on the pivot 29 may slip beneath the retainer to lock the retainer in closed position, as illustrated in Fig. 3. An operating lever spring 32 tensioned between a pin 33 on the lever 31 and a pin 34 on the retainer automatically moves the operating lever to locking position when the handle of the lever is released and the retainer forced downward against the upper end of the hook 11. Movement of the operating lever to locking position is limited by an adjustable limiting screw 35 engaging an integral cross-bracing section 36 of the body. A lock nut 37 is preferably provided to hold the screw 35 in adjusted position. An integral cross-brace 38 preferably connects the upper front corners of the side walls, the inner surface thereof being closely adjacent the surface 26 when the coupling is closed so as to prevent foreign material from entering the coupling. The pivot 29 preferably comprises a cylindrical head 39 engaging one outer surface of the body, and is provided with a slot at its other end for reception of a snap ring retainer 40. The operating lever 31 comprises a manually engageable portion projecting downwardly through a relatively wide slot 42 in the bottom of the body. The slot 42 is quite wide in order that any debris, mud or snow which might enter the coupling will drop out.

In order to latch the operating handle in retainer locking position there is provided a latch lever 43 mounted on a lower pivot 44 and having an integral, transverse handle 45 at its outer end extending laterally through an arcuate slot 46 in the side wall 13. The pivot 44 comprises a cylindrical stem having a semispherical head 47 at one end, and is drilled at the other end for reception of a cotter pin 48. The latch lever 43 is normally urged downward, with the handle 45 in engagement with the lower end of the slot 46, by a compression spring 49, the lower end of which is retained by a projection 50 on the upper surface of the latch lever and the upper end of which is retained in a flaring socket 51 formed in the body 10. The socket 51 is formed in an integral boss projecting rearwardly from the rear wall of the bight portion of the body at one side of the space between the side walls so that the toe 27 may swing rearwardly to the position illustrated in Fig. 4. The outer end of the lever 43 bears against the side surface of a flange 52 extending forwardly from the operating lever 31, the forward edge of the flange being defined by laterally extending surfaces of the lever. The upper portion of the flange is limited rearwardly by a curved upper surface 53, and the lower edge of the flange is limited rearwardly by a curved lower surface 54.

The relationship of the parts is such that the following actions occur: When the latch lever 43 is raised to its upper limit with the handle 45 at the upper end of the slot 46, as seen in Fig. 3, the spring 49 is fully compressed. The tip of the latch lever is now remote from both of the surfaces 53 and 54 so that the operating handle may be pulled rearwardly to a position slightly beyond the position illustrated in Fig. 4. This removes the operating lever from beneath the toe 27, and the spring 32 contracts to raise the retainer to the open position illustrated in Fig. 4. It will be noted that the spring 32 is under slight or medium tension when the coupling is locked (Fig. 3), and that when the retainer is swung open the spring 32 moves to an on-center position, thereby almost completely releasing the spring from tension. Preferably a slight pressure is still exerted by the spring so as to hold the parts against rattling when the coupling is open. The upper end of the operating lever now rests against the curved cam surface 26 which holds the operating lever in the position illustrated in Fig. 4. The latch lever 43 may now be released and the outer end thereof will rest against the upper curved surface 53. In this position the compression spring 49 is only slightly compressed. Enough compression remains to hold the latch lever against the surface 53 and prohibit rattling. A draft eye may now be dropped over the hook 11 and the upper surface of the retainer pressed downwardly to close the coupling. In the event that debris has lodged in the bight of the hook, the draft eye might project upwardly beyond the position it is supposed to occupy and the retainer would be arrested at a position such as illustrated in Fig. 5. In this position the tension spring 32 is stretched to its greatest extent since the operating lever has been forced forwardly by the toe 27 and the pin 34 has moved upwardly. Also, the operating lever has raised the latch lever 43 to some extent so that the compression spring 49 is partially recompressed. The two springs are thus exerting pressures tending to return the parts to the open position, which will immediately happen as soon as the operator releases the retainer. If, however, the retainer is moved to completely closed position the operating lever will snap beneath the retainer to lock it in position and the latch lever will snap downwardly to place the end of the latch lever against the lower surface 54 and latch the operating lever. Both of the springs 32 and 49 are now almost entirely released, the spring 32 returning to a position of slight tension and the spring 49 moving to the position at which there is only slight compression.

It will be realized from the foregoing that the two operating springs are relieved when the coupling is fully closed, and are also relieved when the coupling is fully opened, the tension spring being tensioned to the utmost during the closing of the coupling and the compression spring being compressed to the utmost during the opening of the coupling, both of which conditions are momentary. The springs are thus assured of a long life.

It will also be realized that either spring may break, become displaced, or lost without affecting the holding power of the coupling. If the spring 32 should fail during a trip, the retainer would still be held in closed position since the latch lever 43 and the spring 49 prevent movement of the operating lever. If the spring 49 should fail during a trip, the latch lever will remain in position due to the force of gravity and the spring 32 will also hold the operating lever in position. If it should be necessary to open or close the coupling when the spring 32 has failed, it is obvious that this may be done merely by manually raising the retainer in addition to manually forcing it to closed position. To facilitate this the overhanging portion of the retainer is provided with stiffening flanges 55 along its opposed upper edges. If the spring 49 should fail, the coupling may still be opened and closed in the same manner since gravity will move the latch to latching position.

The coupling is still safe if both springs should fail during a trip since the operating lever is much heavier below the pivot 29 than above it and thus tends to hang vertically with gravity urging it to remain in retainer locking position, the latch lever is subjected to the maximum pull of gravity when in latching position, friction between the lever 31 and the surface 28 and between the latch 43 and the surface 54, tends to prevent movement, and the shock forces encountered during movement tend to lock, rather than open, the coupling. The last described action may be explained as follows: A road shock which would tend to release the coupling would have to be such as to throw the latch 43 upwardly. This would likewise throw the coupled eye upwardly, which would jam the retainer surface 28 down against the operating lever and hold it in position until the latch dropped back into latching position. The latch is prevented from flying beyond the vertical by the boss in which socket 51 is located.

It is to be noted that the coupling is further strengthened in that the thrust on the operating handle when the coupling is closed and subjected to blows by the draft eye is in a direction straight down the handle against the pivot 29. Likewise, any excessive thrusts against the latch lever are in a direction straight along the latch lever against the pivot 44.

Maintenance of the coupling is enhanced since the three pivots may be withdrawn with the use of ordinary tools. A feature is that the three pivots are preferably of different diameters so that the pivots cannot be switched about. Therefore, if inspection of the pivots after all have been withdrawn discloses excessive wear on one, the operator knows which one to replace. Another feature enhancing maintenance is that each pivot is retained by a different type of retainer, only one of which is a nut, so that there is no probability of stripping the threads of one by attempting to apply a nut of a different diameter.

Having illustrated and described a preferred embodiment of the present invention, it should be apparent to those skilled in the art that the same permits of modification in arrangement and detail. I claim as my invention all such modifications as come within the true spirit and scope of the appended claims.

1. A trailer coupling comprising a hollow body formed with a rearwardly and upwardly terminating hook, a retainer pivotally secured to said body forwardly of said hook and having a portion adapted to overlie the bight of said hook, said retainer having a toe portion extending into said body, an operating lever pivotally mounted in said body and including a locking portion extending upwardly beneath said toe portion and into engagement with a downwardly facing surface thereof when said retainer is in closed position, said operating lever being movable from an upright locking position to an inclined releasing position, a tension spring connected at one end to said retainer upwardly and forwardly of its pivot and at its other end to said operating lever upwardly of its pivot, a latch lever pivotally mounted in said body rearwardly of said operating lever and below the pivot thereof, said latch lever being movable from a horizontal latching position to a forwardly inclined unlatching position, said operating lever having adjacent upper and lower surfaces adapted to engage said latch lever, said latch lever engaging said upper surface when both levers are inclined and engaging said lower surface when horizontal to latch said operating lever in upright locking position, a compression spring compressed between said latch lever and said body and tending to move said latch lever into latching engagement with the lower one of said surfaces, said retainer having an upper cam surface adapted to engage said operating lever and hold the same in releasing position when said retainer is opened, said tension spring being substantially released from tension when said retainer is opened and when said retainer is fully closed, and said compression spring being substantially released from compression when said retainer is opened and when said retainer is fully closed, said tension spring automatically moving said operating lever to locking position when said retainer is returned to fully closed position and said compression spring automatically moving said latch lever to latching position in engagement with said lower surface when said retainer is fully closed.

2. A trailer coupling comprising a body including a laterally spaced pair of side walls and a rearwardly extending, upwardly terminating hook, said body having an upper slot extending longitudinally thereof and opening into the space between said side walls at the top of the body and a lower slot extending longitudinally between said side walls at the bottom of said body, a retainer pivotally secured to said body opposite said hook and extending through said upper slot, said retainer having a retaining portion extending rearwardly of its pivot and over the bight of said hook and a toe portion extending forwardly of its pivot and into said body, an operating lever pivotally mounted in said body, said operating lever including a locking portion extending upwardly from its pivot beneath and into engagement with said toe portion when said operating lever is in locking position and said retainer is in closed position and a handle portion extending downwardly from its pivot through said lower slot, and a tension spring tensioned between said toe portion of the retainer and said locking portion of the operating lever, said operating lever being movable to a releasing position with said locking portion displaced forwardly to permit opening movement of said retainer and said tension spring being biased to resist such movement, said toe portion having an upper cam surface engageable with said operating lever when moved to releasing position, and said tension spring being substantially released from tension when said operating lever is in locking position and when said operating lever is in releasing position and being increasingly tensioned as said retainer moves from opened position to almost closed position.

3. A trailer coupling comprising a body having an upwardly terminating hook thereon, a retainer pivotally mounted in said body and including a retaining portion extending rearwardly from its pivot to overlie the tip of said hook when in closed position and movable upwardly to permit the association of a draft eye with said hook, said retainer having an oppositely extending toe portion, a generally upright operating lever pivotally mounted in said body and including a locking portion extending upwardly from its pivot and movable from a locking position beneath said toe portion to a releasing position beyond said toe portion, a tension spring biased between the toe portion of said retainer and the locking portion of said operating lever in such manner as to be placed under maximum tension when said locking portion is moved to releasing position, said tension spring being attached to said retainer in an off-center relation with respect to its pivot when in retaining position whereby upon movement of said operating lever to releasing position said spring moves to an on-center position with respect to the pivot of said retainer to raise said retaining portion and release the tension of said spring.

4. The construction set forth in claim 3 wherein said operating lever comprises a greater mass below its pivot than above its pivot whereby gravity tends to hold said locking portion in locking engagement with said toe portion of the retainer.

5. The construction set forth in claim 3 wherein said operating lever comprises a heavier mass below its pivot than above its pivot whereby gravity tends to hold said locking portion in locking engagement with the toe portion of said retainer, and spring means are provided to bias said locking portion toward locking engagement with said toe portion of the retainer.

References Cited in the file of this patent

UNITED STATES PATENTS

| | | |
|---|---|---|
| 2,124,839 | Weiss | July 26, 1938 |
| 2,426,532 | Tierney | Aug. 26, 1947 |
| 2,431,694 | Johnson | Dec. 2, 1947 |
| 2,609,213 | Buckendale | Sept. 2, 1952 |